US012773960B2

(12) United States Patent
Casoli et al.

(10) Patent No.: US 12,773,960 B2
(45) Date of Patent: Oct. 27, 2026

(54) VEHICLE ELECTRIC SYSTEM

(71) Applicant: FERRARI S.P.A., Modena (IT)

(72) Inventors: Luca Casoli, Modena (IT); Giovanni Lo Calzo, Modena (IT); Ugo Sitta, Modena (IT); Enrico Rovelli, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 18/966,944

(22) Filed: Dec. 3, 2024

(65) Prior Publication Data

US 2025/0187555 A1 Jun. 12, 2025

(51) Int. Cl.
*B60R 16/033* (2006.01)
*H01R 4/02* (2006.01)
*H01R 4/48* (2006.01)

(52) U.S. Cl.
CPC ........... *B60R 16/033* (2013.01); *H01R 4/029* (2013.01); *H01R 4/4811* (2023.08); *H01R 4/485* (2023.08)

(58) Field of Classification Search
CPC ........ B60R 16/033; B60R 16/02; H01R 4/029; H01R 4/4811; H01R 4/485; H01R 12/71; H01R 13/2414; H02J 2105/30; H02J 7/64; H02J 1/02; H02M 1/44; H05K 1/144; H05K 1/18
See application file for complete search history.

(56) References Cited

U.S. PATENT DOCUMENTS

2018/0049314 A1 2/2018 Amaducci et al.
2024/0107687 A1 3/2024 Song et al.

FOREIGN PATENT DOCUMENTS

CN 218123905 U 12/2022
DE 102023101144 A1 * 7/2024 ............ H02M 1/123
WO 2022124649 A1 6/2022

OTHER PUBLICATIONS

Italian Search Report and Written Opinion dated May 24, 2024 of IT Application No. 202300026118 filed on Dec. 6, 2023, 7 pages.

* cited by examiner

*Primary Examiner* — Rexford N Barnie
*Assistant Examiner* — Thai H Tran
(74) *Attorney, Agent, or Firm* — CANTOR COLBURN LLP

(57) ABSTRACT

A vehicle electric system has an electrical connection device to connect a power supply device and at least one electric/electronic apparatus to one another, and a filtering device, which is associated with the electrical connection device to at least limit interfering voltages and/or currents generated by the electric/electronic apparatus, is powered with the electric current supplied through the electrical connection device and is provided with at least two filtering modules mounted in series to one another and connected to one another in a releasable manner.

9 Claims, 2 Drawing Sheets

VEHICLE ELECTRIC SYSTEM

CROSS-REFERENCE TO RELATED APPLICATIONS

This patent application claims priority from Italian patent application no. 102023000026118 filed on Dec. 6, 2023, the entire disclosure of which is incorporated herein by reference.

TECHNICAL FIELD

The invention relates to a vehicle electric system.

In particular, the invention relates to a vehicle electric system of the type comprising at least one electric/electronic apparatus; a power supply device, normally a battery, to electrically power the electric/electronic apparatus; an electrical connection device to connect the power supply device and the electric/electronic apparatus to one another; and a filtering device associated with the electrical connection device to at least limit interfering voltages and/or currents generated by the electric/electronic apparatus itself.

BACKGROUND

Generally speaking, the electrical connection device comprises a busbar provided with a plurality of conductor bars made of a metal material, for example copper or aluminium; and the filtering device comprises a passive EMC (Electromagnetic Compatibility) filter provided with a printed circuit board and with a plurality of electronic components, in particular capacitors and inductances, mounted on the printed circuit board and electrically connected to one another through the printed circuit board.

Known vehicle electric systems of the type described above suffer from some drawbacks, which are mainly due to the fact that the limitation of interfering voltages and/or currents having different frequencies leads to the use of a plurality of filtering devices and makes said vehicle electric systems relatively large-sized, complex and expensive.

SUMMARY

The object of the invention is to provide a vehicle electric system that is not affected by the aforementioned drawbacks and can be manufactured in a simple and economic fashion.

According to the invention, there is provided a vehicle electric system as claimed in the appended claims.

BRIEF DESCRIPTION OF THE DRAWINGS

The invention will now be described with reference to the accompanying drawings showing a non-limiting embodiment thereof, wherein.

DESCRIPTION OF EMBODIMENTS

Figure 1:
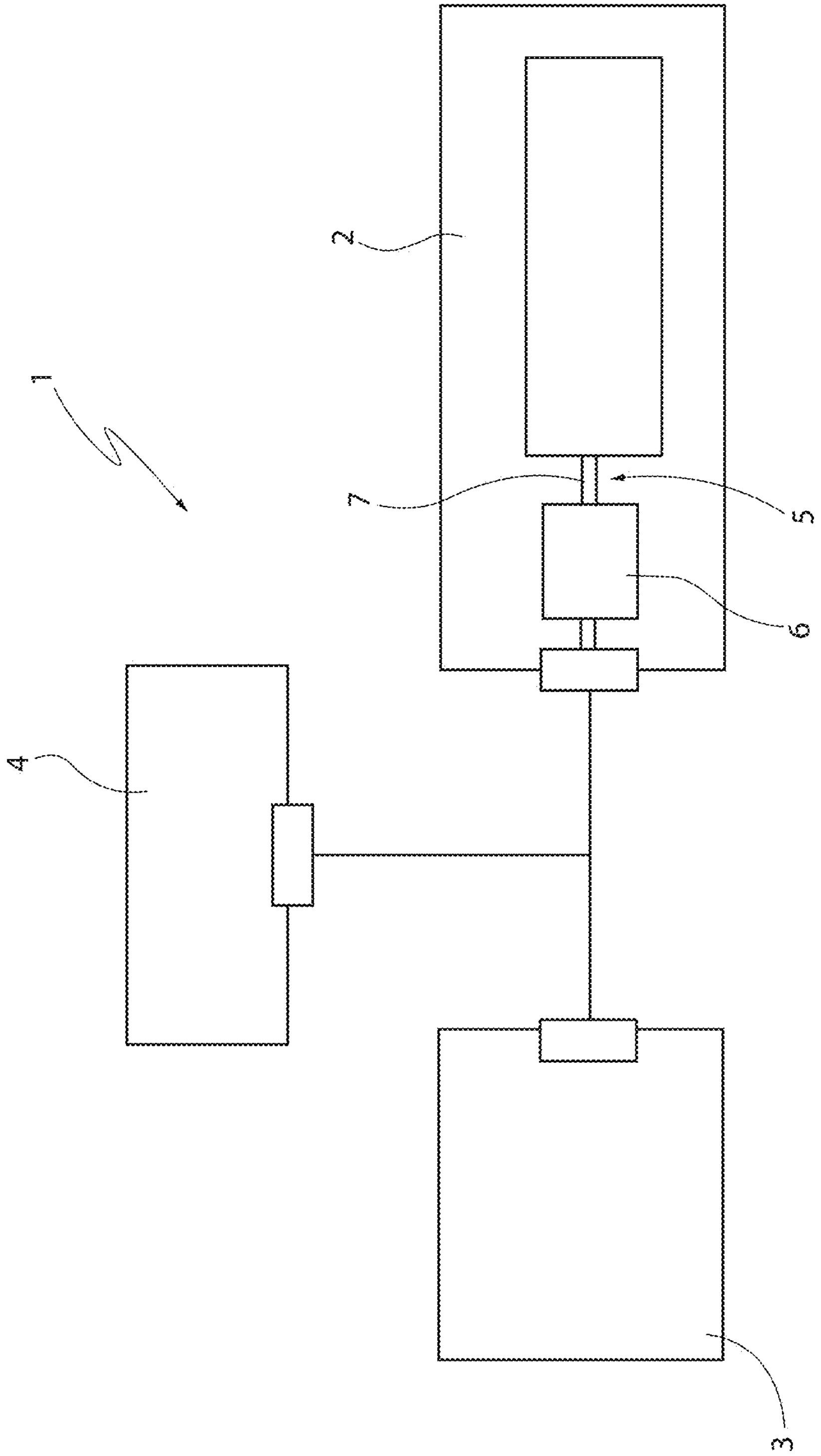
FIG. 1 schematically shows a preferred embodiment of the vehicle electric system according to the invention.
Figure 3:
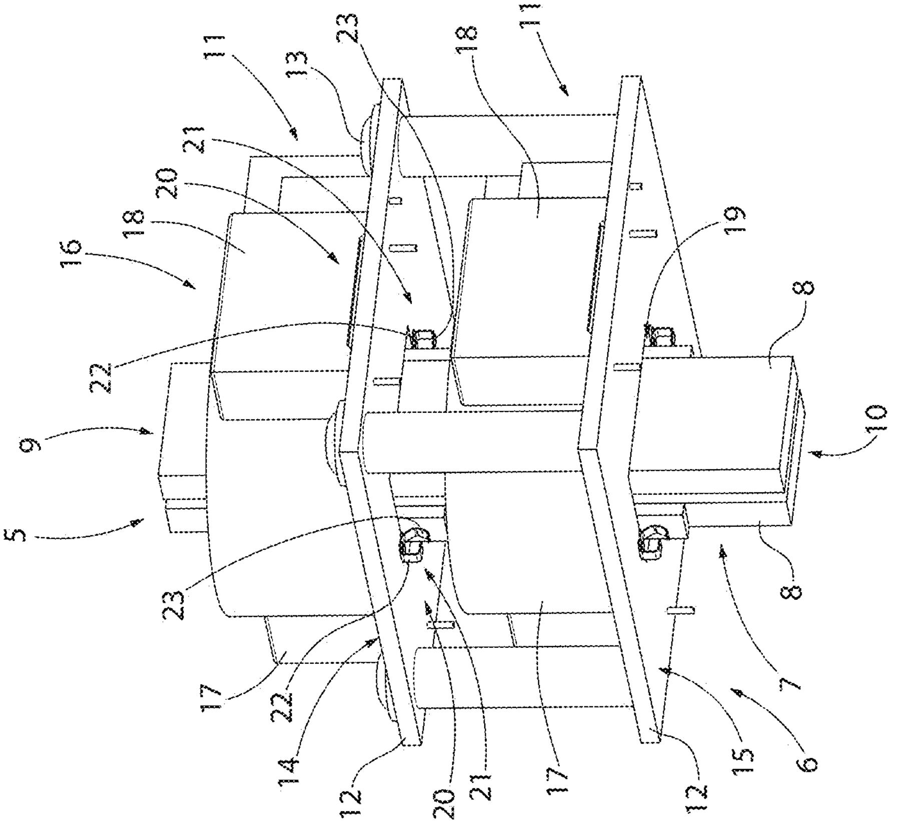
FIGS. 2 and 3 show two schematic perspective views, with parts removed for greater clarity, of a detail of the vehicle electric system of FIG. 1.
Figure 2:
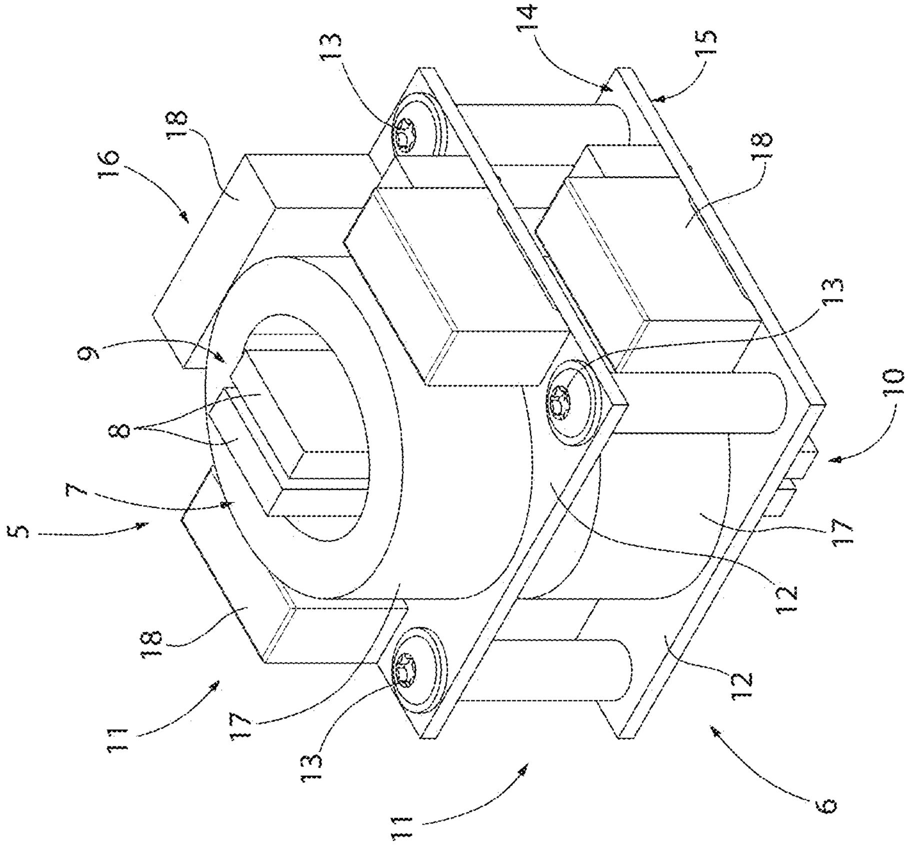

With reference to FIG. 1, number 1 indicates, as a whole, a vehicle electric system mounted in a road vehicle (not shown).

The electric system 1 comprises a first electric/electronic apparatus 2; a second electric/electronic apparatus 3; and a power supply device 4, normally a battery, to electrically power the apparatuses 2 and 3.

The electric system 1 further comprises an electrical connection device 5 to connect the power supply device 4 and the apparatus 2 to one another; and a filtering device 6 associated with the device 5 to at least limit interfering voltages and/or currents generated by the apparatus 2.

The device 5 comprises a busbar 7 having a plurality of bars 8 made of a conductive material (in this case, two bars 8), each having an input 9 connected to the device 4 and an output 10 connected to the apparatus 2.

The device 6 comprises a plurality of filtering modules 11 (in this case, two modules 11), which are mounted in series to one another, can be connected to one another in a releasable manner and are configured to limit respective interfering currents having different frequencies from one another. In other words, the two filtering modules 11 have different cut-off frequencies (in particular, they are configured to filter different frequency bands).

Advantageously, though not in a limiting manner, each module acts upon given frequencies adding up to what is filtered by the adjacent module.

In particular, with modules mounted in series, the two filtering modules 11 are arranged in sequence (not in contact with one another) along a longitudinal axis of the bars 8.

More in particular, each filtering module 11 acts upon both bars 8 of the busbar 7. Each filtering module 11 is (completely) crossed by the busbar 7, in particular, each filtering module 11 radially surrounds the busbar 7 and, hence, the bars 8.

Each module 11 comprises a passive EMC (Electromagnetic Compatibility) filter provided with a printed circuit board 12 with a flat shape, which extends parallel to the printed circuit board 12 of the other module 11, is connected to the printed circuit board 12 of the other module 11 in a releasable manner by means of a plurality of fastening screws 13 and is delimited by two main faces 14, 15 opposite one another.

The module 11 is further provided with a plurality of electronic components 16 mounted on the printed circuit board 12 and electrically connected to one another through the printed circuit board 12.

The electronic components 16 of each module 11 comprise, in this specific case, a central inductance 17 with a tubular shape, which is fixed to the face 14 of the printed circuit board 12 and extends around the bars 8, and a plurality of side capacitors 18, which are mounted on the face 14 of the printed circuit board 12 and are arranged around the inductance 17.

With regard to what discussed above, it should be pointed out that the bars 8 extend perpendicularly to the printed circuit boards 12 and through an opening 19 obtained in each printed circuit board 12.

The electric system 1 further comprises, for each module 11, a respective plurality of electrical connection members 20 to power the module 11 with the electric current supplied through the bars 8 of the electrical connection device 5.

Each member 20 comprises an elastic connection element defined by a shaped leaf spring 21, which is made of a conductive material, is interposed between the electrical connection device 5 and the filtering device 6 and has a first end 22 fixed, in this case welded, to the inner wall of the opening 19 of the relative printed circuit board 12 and a second end 23 electrically connected to a relative bar 8 through mechanical interference.

In use, the electrical connection between the bars 8 of the electrical connection device 5 and the printed circuit boards 12 of the filtering modules 11 allows the filtering device 6 to at least limit interfering voltages and/or currents with different frequencies generated by the apparatus 2 and, therefore, to guarantee the correct operation of the apparatus 3.

With regard to what discussed above, it should be pointed out that, according to alternative embodiments that are not shown herein, the inductance 17 has shapes other than the circular one, for example the shape of a parallelepiped, and is manufactured as one piece or two pieces connected to one another, for example through gluing.

The invention claimed is:

1. A vehicle electric system comprising:

at least one electric/electronic apparatus;

a power supply device to electrically power the at least one electric/electronic apparatus;

an electrical connection device to connect the power supply device and the electric/electronic apparatus to one another;

a filtering device associated with the electrical connection device to at least limit interfering voltages and/or currents generated by said electric/electronic apparatus; and electrical connection means to power the filtering device with the electric current supplied through the electrical connection device; and characterized in that the filtering device comprises at least two filtering modules mounted in series to one another and coupling means to connect the filtering modules to one another in a releasable manner;

wherein each filtering module comprises a printed circuit board;

wherein the electrical connection device comprises at least one conductor bar mounted between the power supply device and said electric/electronic apparatus;

wherein the electrical connection means comprise, for each filtering module, at least one respective elastic connection element; and wherein each of the at least one respective elastic connection elements comprises a shaped leaf spring having a first end fixed to an inner wall of an opening of the respective printed circuit board and a second end electrically connected to a respective one of the at least one conductor bar through mechanical interference.

2. The system according to claim 1, wherein the filtering modules are configured to limit respective interfering voltages and/or currents having different frequencies from one another.

3. The system according to claim 1, wherein the at least one respective elastic connection element (21) is made of conductive material and interposed between the electrical connection device (5) and the filtering module (11).

4. The system according to claim 3, wherein each shaped leaf spring is fixed to the relative filtering module and stressed in a compressive manner by the electrical connection device.

5. The system according to claim 1, wherein the electrical connection-comprises a busbar.

6. The system according to claim 1, wherein each filtering module comprises a passive EMC (Electromagnetic Compatibility) filter.

7. The system according to claim 1, wherein each filtering module further comprises a plurality of electronic components, in particular inductances and capacitors, mounted on the printed circuit board and electrically connected to one another through the printed circuit board.

8. The system according to claim 7, wherein each filtering module comprises at least one inductance with an annular shape mounted on the printed circuit board, and wherein each conductor bar extends through the inductances.

9. The system according to claim 8, wherein each conductor bar extends perpendicularly to and through the printed circuit boards of the filtering modules.

* * * * *